(12) United States Patent
Johnson et al.

(10) Patent No.: US 10,387,627 B2
(45) Date of Patent: Aug. 20, 2019

(54) SYSTEMS AND METHODS FOR ANALYZING SOFTWARE

(71) Applicant: Kryptowire LLC, Fairfax, VA (US)

(72) Inventors: Ryan Johnson, Warrenton, VA (US);
Nikolaos Kiourtis, Fairfax, VA (US);
Angelos Stavrou, Fairfax, VA (US)

(73) Assignee: KRYPTOWIRE LLC, McLean, VA (US)

( * ) Notice: Subject to any disclaimer, the term of this patent is extended or adjusted under 35 U.S.C. 154(b) by 136 days.

(21) Appl. No.: 15/279,089

(22) Filed: Sep. 28, 2016

(65) Prior Publication Data

US 2017/0091428 A1    Mar. 30, 2017

Related U.S. Application Data (60) Provisional application No. 62/233,590, filed on Sep. 28, 2015.

(51) Int. Cl.
| | | |
|---|---|---|
| *G06F 21/00* | (2013.01) | |
| *H04L 29/06* | (2006.01) | |
| *G06F 21/10* | (2013.01) | |
| *G06F 21/31* | (2013.01) | |
| *G06F 17/30* | (2006.01) | |

(52) U.S. Cl.
CPC ............ *G06F 21/10* (2013.01); *G06F 21/316* (2013.01); *G06F 2221/0773* (2013.01); *G06F 2221/2133* (2013.01)

(58) Field of Classification Search
CPC .................... G06F 21/10; G06F 2221/0773
See application file for complete search history.

(56) References Cited

U.S. PATENT DOCUMENTS

| | | | | |
|---|---|---|---|---|
| 7,870,610 | B1 * | 1/2011 | Mitchell | G06F 21/53 |
| | | | | 726/22 |
| 8,516,590 | B1 * | 8/2013 | Ranadive | H04L 63/1433 |
| | | | | 713/187 |
| 2007/0061450 | A1 * | 3/2007 | Burnley | G06F 11/3419 |
| | | | | 709/224 |
| 2010/0169655 | A1 * | 7/2010 | Chastagnol | G06Q 30/06 |
| | | | | 713/176 |

FOREIGN PATENT DOCUMENTS

WO    WO-2006094880 A1 *    9/2006    ............. G06F 21/10

OTHER PUBLICATIONS

Armijn Hemel, Karl Trygve Kalleberg, Rob Vermaas, Eelco Dolstra; "Finding software license violations through binary code clone detection"; May 2011; MSR '11: Proceedings of the 8th Working Conference on Mining Software Repositories; Publisher: ACM; pp. 63-72 (Year: 2011).*

(Continued)

*Primary Examiner* — Kendall Dolly
*Assistant Examiner* — Courtney D Fields
(74) *Attorney, Agent, or Firm* — Mannava & Kang, P.C.; Vinay Malik (57) ABSTRACT

Disclosures herein describe methods and systems for detecting unlicensed content that can be accessed by electronic devices using an automated framework for analyzing applications present on the electronic device that allow a user of the electronic device to access unlicensed content.

18 Claims, 8 Drawing Sheets

(56) References Cited

OTHER PUBLICATIONS

T. Bläsing, L. Batyuk, A. D. Schmidt, S. A. Camtepe, and S. Albayrak, "An android application sandbox system for suspicious software detection," in Malicious and unwanted software (Malware), 2010 5th international conference on. IEEE, 2010, pp. 55-62.

L. Weichselbaum, M. Neugschwandtner, M. Lindorfer, Y. Fratantonio, V. van der Veen, and C. Platzer, "Andrubis: Android malware under the magnifying glass," Vienna University of Technology, Tech. Rep. TR-ISECLAB-0414-001, 2014, pp. 1-10.

M. N. P. Pravin, "Vetdroid: Analysis using permission for vetting undesirable behaviours in android applications.", International Journal of Innovative and Emerging Research in Engineering, vol. 2, Issue 3, 2015, pp. 1-6.

K. Tam, S. J. Khan, A. Fattori, and L. Cavallaro, "Copperdroid: Automatic reconstruction of android malware behaviors," in NDSS, 2015, pp. 1-15.

L. K. Yan and H. Yin, "Droidscope: Seamlessly reconstructing the os and dalvik semantic views for dynamic android malware analysis," in USENIX security symposium, 2012, pp. 1-15.

R. Mahmood, N. Esfahani, T. Kacem, N. Mirzaei, S. Malek, and A. Stavrou, "A white box approach for automated security testing of android applications on the cloud," in Automation of Software Test (AST), 2012 7th International Workshop on. IEEE, 2012, pp. 22-28.

M. Zheng, M. Sun, and J. C. Lui, "Droidtrace: a ptrace based android dynamic analysis system with forward execution capability," in Wireless Communications and Mobile Computing Conference (IWCMC), 2014 International. IEEE, 2014, pp. 128-133.

M. Lindorfer, M. Neugschwandtner, and C. Platzer, "Marvin: Efficient and comprehensive mobile app classification through static and dynamic analysis," in Computer Software and Applications Conference (COMPSAC), 2015 IEEE 39th Annual, vol. 2. IEEE, 2015, pp. 422-433.

T. Azim and I. Neamtiu, "Targeted and depth-first exploration for systematic testing of android apps," in ACM SIGPLAN Notices, vol. 48, No. 10. ACM, 2013, pp. 641-660.

W. C. Wu and S. H. Hung, "Droiddolphin: a dynamic android malware detection framework using big data and machine learning," in Proceedings of the 2014 Conference on Research in Adaptive and Convergent Systems. ACM, 2014, pp. 247-252.

W. Diao, X. Liu, Z. Li, and K. Zhang, "Evading android runtime analysis through detecting programmed interactions," in Proceedings of the 9th ACM Conference on Security & Privacy in Wireless and Mobile Networks. ACM, 2016, pp. 159-164.

T. Petsas, G. Voyatzis, E. Athanasopoulos, M. Polychronakis, and S. Ioannidis, "Rage against the virtual machine: hindering dynamic analysis of android malware," in Proceedings of the Seventh European Workshop on System Security. ACM, 2014, p. 5.

T. Vidas and N. Christin, "Evading android runtime analysis via sandbox detection," in Proceedings of the 9th ACM symposium on Information, computer and communications security. ACM, 2014, pp. 447-458.

S. T. Sun, A. Cuadros, and K. Beznosov, "Android rooting: Methods, detection, and evasion," in Proceedings of the 5th Annual ACM CCS Workshop on Security and Privacy in Smartphones and Mobile Devices. ACM, 2015, pp. 3-14.

M. D. Ernst, "Static and dynamic analysis: Synergy and duality," in WODA 2003: ICSE Workshop on Dynamic Analysis, 2003, pp. 24-27.

S. R. Choudhary, A. Gorla, and A. Orso, "Automated test input generation for android: Are we there yet?," in Automated Software Engineering (ASE), 2015 30th IEEE/ACM International Conference on. IEEE, 2015, pp. 429-440.

M. Lindorfer, M. Neugschwandtner, L. Weichselbaum, Y. Fratantonio, V. Van Der Veen, and C. Platzer, "Andrubis-1,000,000 apps later: A view on current android malware behaviors," in Building Analysis Datasets and Gathering Experience Returns for Security (BADGERS), 2014 Third International Workshop on. IEEE, 2014, pp. 3-17.

P. Godefroid, M. Y. Levin, and D. Molnar, "Sage: whitebox fuzzing for security testing," Queue, vol. 10, No. 1, p. 20, 2012.

J. C. King, "A new approach to program testing," in ACM SIGPLAN Notices, vol. 10, No. 6. ACM, 1975, pp. 228-233.

R. S. Boyer, B. Elspas, and K. N. Levitt, "Select—a formal system for testing and debugging programs by symbolic execution," ACM SigPlan Notices, vol. 10, No. 6, pp. 234-245, 1975.

K. Sen, D. Marinov, and G. Agha, "Cute: a concolic unit testing engine for c," in ACM SIGSOFT Software Engineering Notes, vol. 30, No. 5. ACM, 2005, pp. 263-272.

S. Anand, M. Naik, M. J. Harrold, and H. Yang, "Automated concolic testing of smartphone apps," in Proceedings of the ACM SIGSOFT 20th International Symposium on the Foundations of Software Engineering. ACM, 2012, p. 59.

R. P. Pargas, M. J. Harrold, and R. R. Peck, "Test-data generation using genetic algorithms," Software Testing Verification and Reliability, vol. 9, No. 4, pp. 263-282, 1999.

R. Mahmood, N. Mirzaei, and S. Malek, "Evodroid: Segmented evolutionary testing of android apps," in Proceedings of the 22nd ACM SIGSOFT International Symposium on Foundations of Software Engineering. ACM, 2014, pp. 599-609.

D. Amalfitano, A. R. Fasolino, P. Tramontana, B. D. Ta, and A. M. Memon, "Mobiguitar: Automated model-based testing of mobile apps," IEEE Software, vol. 32, No. 5, pp. 53-59, 2015.

J. W. Duran and S. C. Ntafos, "An evaluation of random testing," IEEE transactions on software engineering, No. 4, pp. 438-444, 1984.

D. Brumley, C. Hartwig, Z. Liang, J. Newsome, D. Song, and H. Yin, "Automatically identifying trigger-based behavior in malware," in Botnet Detection. Springer, 2008, pp. 65-88.

J. C. King, "Symbolic execution and program testing," Communications of the ACM, vol. 19, No. 7, pp. 385-394, 1976.

Z. Yang, M. Yang, Y. Zhang, G. Gu, P. Ning, and X. S. Wang, "Appintent: Analyzing sensitive data transmission in android for privacy leakage detection," in Proceedings of the 2013 ACM SIGSAC conference on Computer & communications security. ACM, 2013, pp. 1043-1054.

N. Mirzaei, S. Malek, C. S. Pasareanu, N. Esfahani, and R. Mahmood, "Testing android apps through symbolic execution," ACM SIGSOFT Software Engineering Notes, vol. 37, No. 6, pp. 1-5, 2012.

J. Jeon, K. K. Micinski, and J. S. Foster, "Symdroid: Symbolic execution for dalvik bytecode," Tech. Rep., 2012, 17 pages.

C. Cadar and K. Sen, "Symbolic execution for software testing: three decades later," Communications of the ACM, vol. 56, No. 2, pp. 82-90, 2013.

C. Cadar, D. Dunbar, D. R. Engler et al., "Klee: Unassisted and automatic generation of high-coverage tests for complex systems programs," in OSDI, vol. 8, 2008, pp. 209-224.

C. Cadar and D. Engler, "Execution generated test cases: How to make systems code crash itself," Model Checking Software, pp. 902-902, 2005.

J. Schütte, R. Fedler, and D. Titze, "Condroid: Targeted dynamic analysis of android applications," in Advanced Information Networking and Applications (AINA), 2015 IEEE 29th International Conference on. IEEE, 2015, pp. 571-578.

X. Zhang, N. Gupta, and R. Gupta, "Locating faults through automated predicate switching," in Proceedings of the 28th international conference on Software engineering. ACM, 2006, pp. 272-281.

J. Wilhelm and T. C. Chiueh, "A forced sampled execution approach to kernel rootkit identification," in International Workshop on Recent Advances in Intrusion Detection. Springer, 2007, pp. 219-235.

F. Peng, Z. Deng, X. Zhang, D. Xu, Z. Lin, and Z. Su, "X-force: Force-executing binary programs for security applications," in USENIX Security, 2014, pp. 829-844.

R. Johnson and A. Stavrou, "Forced-path execution for android applications on x86 platforms," in Software Security and Reliability-Companion (SERE-C), 2013 IEEE 7th International Conference on. IEEE, 2013, pp. 188-197.

(56) References Cited

OTHER PUBLICATIONS

R. Johnson, Z. Wang, A. Stavrou, and J. Voas, "Exposing software security and availability risks for commercial mobile devices," in Reliability and Maintainability Symposium (RAMS), 2013 Proceedings-Annual. IEEE, 2013, pp. 1-7.
Y. Jing, Z. Zhao, G. J. Ahn, and H. Hu, "Morpheus: automatically generating heuristics to detect android emulators," in Proceedings of the 30th Annual Computer Security Applications Conference. ACM, 2014, pp. 216-225.
W. Enck, P. Gilbert, S. Han, V. Tendulkar, B. G. Chun, L. P. Cox, J. Jung, P. McDaniel, and A. N. Sheth, "Taintdroid: an information-flow tracking system for real time privacy monitoring on smartphones," ACM Transactions on Computer Systems (TOCS), vol. 32, No. 2, p. 5, 2014.
T. Vidas and N. Christin, "Sweetening android lemon markets: measuring and combating malware in application marketplaces," in Proceedings of the third ACM conference on Data and application security and privacy. ACM, 2013, pp. 197-208.
R. Potharaju, A. Newell, C. Nita-Rotaru, and X. Zhang, "Plagiarizing smartphone applications: attack strategies and defense techniques," in International Symposium on Engineering Secure Software and Systems. Springer, 2012, pp. 106-120.
W. Zhou, Y. Zhou, X. Jiang, and P. Ning, "Detecting repackaged smartphone applications in third-party android marketplaces," in Proceedings of the second ACM conference on Data and Application Security and Privacy. ACM, 2012, pp. 317-326.
M. Graa, N. C. Boulahia, F. Cuppens, and A. Cavalliy, "Protection against code obfuscation attacks based on control dependencies in android systems," in Software Security and Reliability-Companion (SERE-C), 2014 IEEE Eighth International Conference on. IEEE, 2014, pp. 149-157.
D. Maier, M. Protsenko, and T. Muëller, "A game of droid and mouse: The threat of split-personality malware on android," Computers & Security, vol. 54, p. 2-15, 2015.
M. C. Grace, Y. Zhou, Z. Wang, and X. Jiang, "Systematic detection of capability leaks in stock android smartphones." in NDSS, 2012, 15 pages.
D. Barrera, J. Clark, D. McCarney, and P. C. Van Oorschot, "Understanding and improving app installation security mechanisms through empirical analysis of android," in Proceedings of the second ACM workshop on Security and privacy in smartphones and mobile devices. ACM, 2012, pp. 81-92.
E. Chin, A. P. Felt, K. Greenwood, and D. Wagner, "Analyzing inter-application communication in Android," in Proceedings of the 9th international conference on Mobile systems, applications, and services. ACM, 2011, pp. 239-252.
R. Johnson, M. Elsabagh, and A. Stavrou, "Why software dos is hard to fix: Denying access in embedded android platforms," in International Conference on Applied Cryptography and Network Security. Springer, 2016, pp. 193-211.
J. H. Jung, J. Y. Kim, H. C. Lee, and J. H. Yi, "Repackaging attack on android banking applications and its countermeasures," Wireless Personal Communications, vol. 73, No. 4, pp. 1421-1437, 2013.
R. Sasnauskas and J. Regehr, "Intent fuzzer: crafting intents of death," in Proceedings of the 2014 Joint International Workshop on Dynamic Analysis (WODA) and Software and System Performance Testing, Debugging, and Analytics (PERTEA). ACM, 2014, pp. 1-5.
A. Zhang, Y. He, and Y. Jiang, "Crashfuzzer: Detecting input processing related crash bugs in android applications," in Performance Computing and Communications Conference (IPCCC), 2016 IEEE 35th International. IEEE, 2016, pp. 1-8.
A. K. Maji, F. A. Arshad, S. Bagchi, and J. S. Rellermeyer, "An empirical study of the robustness of inter-component communication in android," in Dependable Systems and Networks (DSN), 2012 42nd Annual IEEE/IFIP International Conference on. IEEE, 2012, pp. 1-12.
R. Johnson, M. Elsabagh, A. Stavrou, and V. Sritapan, "Targeted dos on android: how to disable android in 10 seconds or less," in Malicious and Unwanted Software (Malware), 2015 10th International Conference on. IEEE, 2015, pp. 136-143.
A. P. Felt, E. Ha, S. Egelman, A. Haney, E. Chin, and D. Wagner, "Android permissions: User attention, comprehension, and behavior," in Proceedings of the 2012 Symposium on Usable Privacy and Security (SOUPS), 2012, pp. 1-11.
P. G. Kelley, S. Consolvo, L. F. Cranor, J. Jung, N. Sadeh, and D. Wetherall, "A Conundrum of Permissions: Installng Applications on an Android Smartphone," in Workshop on Usable Security (USEC), 2012, pp. 68-79.
S. Lu, P. Zhou, W. Liu, Y. Zhou, and J. Torrellas, "PathExpander: Architectural Support for Increasing the Path Coverage of Dynamic Bug Detection," in Proceedings of the 39th Annual IEEE/ACM International Symposium on Microarchitecture (MICRO), 2006, pp. 1-12.
L. Xu, F. Sun, and Z. Su, "Constructing precise control flow graphs from binaries," Technical report CSE-2009-27, Department of Computer Science, UC Davis, 2009, pp. 1-21.
R. E. Bryant, "Symbolic boolean manipulation with ordered binary decision diagrams," ACM Computing Surveys, 24 (3):293 318, Sep. 1992, pp. 1-36.
Z. Zhu, G. Lu, Y. Chen, Z. Fu, P. Roberts, and K. Han, "Botnet research survey," in 32nd Annual IEEE Int. Computer Software and Applications (COMPSAC 08), pp. 967-972, 2008.
X. Jiang, X. Wang, and D. Xu, "Stealthy malware detection through VMM-based out-of-the-box semantic view reconstruction," in Proceedings of the 14th ACM Conference on Computer and Communications Security (CCS), pp. 128-138, Oct. 2007.
I. Burguera, U. Zurutuza, and S. Nadjm-Therani, "Crowdroid: behavior-based malware detection system for android," in Proceedings of the 1st ACM workshop on Security and privacy in smartphones and mobile devices (SPSM11), 2011, pp. 1-11.
A. P. Felt, E. Chin, S. Hanna, D. Song, and D. Wagner, "Android permissions demystified," in Proceedings of the 18th ACM conference on Computer and Communications Security, CCS 11, pp. 627-638, New York, NY, USA, 2011.
D.M. Cohen, S.R. Dalal, J. Parelius, and G.C. Patton, "The Combinatorial Design Approach to Automatic Test Generation," IEEE Software, 13(5):8389, Sep. 1996, pp. 83-88.
S. T. King, P. M. Chen, Y. M. Wang, C. Verbowski, H. J. Wang, and J. R. Lorch, "SubVirt: Implementing Malware with Virtual Machines," in Proceedings of the 2006 IEEE Symposium on Security and Privacy, May 2006, pp. 1-14.
H. Kaiya and K. Kaijiri, "Specifying runtime environments and functionalities of downloadable components under the sandbox model," in Principles of Software Evolution, 2000. Proceedings. International Symposium on, 2000, pp. 138-142.
C. Lattner and V. Adve, "Llvm: A compilation framework for lifelong program analysis & transformation," in Proceedings of the International Symposium on Code Generation and Optimization: Feedback-directed and Runtime Optimization, ser. CGO '04. Washington, DC, USA: IEEE Computer Society, 2004, 12 pages.
Y. Nadji, M. Antonakakis, R. Perdisci, and W. Lee, "Understanding the prevalence and use of alternative plans in malware with network games," in Proceedings of the 27th Annual Computer Security Applications Conference. ACM, 2011, pp. 1-10.
M. Graziano, C. Leita, and D. Balzarotti, "Towards network containment in malware analysis systems," in Proceedings of the 28th Annual Computer Security Applications Conference. ACM, 2012, pp. 339-348.
V. Rastogi, Y. Chen, and X. Jiang, "Droidchameleon: evaluating android anti-malware against transformation attacks," in Proceedings of the 8th ACM SIGSAC symposium on Information, computer and communications security. ACM, 2013, pp. 329-334.
M. Linares-Vásquez, A. Holtzhauer, C. Bernal-Cárdenas, and D. Poshyvanyk, "Revisiting android reuse studies in the context of code obfuscation and library usages," in Proceedings of the 11th Working Conference on Mining Software Repositories. ACM, 2014, pp. 242-251.
M. Protsenko and T. Muller, "Pandora applies non-deterministic obfuscation randomly to android," in Malicious and Unwanted Software:" The Americas" (Malware), 2013 8th International Conference on. IEEE, 2013, pp. 59-67.

(56) References Cited

OTHER PUBLICATIONS

R. Majumdar and K. Sen, "Hybrid concolic testing," in Software Engineering, 2007. ICSE 2007. 29th International Conference on. IEEE, 2007, pp. 416-426.

K. Sen and G. Agha, "Cute and jcute: Concolic unit testing and explicit path model-checking tools," in Computer Aided Verification. Springer, 2006, pp. 419-423.

P. Garg, F. Ivancic, G. Balakrishnan, N. Maeda, and A. Gupta, "Feedback-directed unit test generation for c/c++ using concolic execution," in Proceedings of the 2013 International Conference on Software Engineering. IEEE Press, 2013, pp. 132-141.

* cited by examiner

```
JNIEXPORT jobject JNICALL
Java_com_kryptowire_randomapp_SMS_getSMSMessages(JN
IEnv * env, jobject obj, jobject context)
{
    jclass uri_cls = (*env)->FindClass(env,
"android/net/Uri");
    jmethodID methodId = (*env)-
>GetStaticMethodID(env, uri_cls, "parse", "(Ljava/
lang/String;)Landroid/net/Uri;");
    const char sms_uri[] = "content://sms";
    jstring contentBuf = (*env)->NewStringUTF(env,
sms_uri);
    jobject uri = (*env)-
>CallStaticObjectMethod(env, uri_cls, methodId,
contentBuf);
    jclass cls_context = (*env)->FindClass(env,
"android/content/Context");
    jmethodID contentResolverMid = (*env)-
>GetMethodID(env, cls_context,
"getContentResolver", "()Landroid/content/
ContentResolver;");
    jobject cr = (*env)->CallObjectMethod(env,
context, contentResolverMid);
    jclass cls_cr = (*env)->FindClass(env,
"android/content/ContentResolver");
    jmethodID queryMid = (*env)->GetMethodID(env,
cls_cr, "query", "(Landroid/net/Uri;[Ljava/lang/
String;Ljava/lang/String;[Ljava/lang/String;Ljava/
lang/String;)Landroid/database/Cursor;");
    jobject cursor = (*env)->CallObjectMethod(env,
cr, queryMid, uri, NULL, NULL, NULL, NULL);
    return cursor;
}
```

FIG. 8

```
Contents of section .rodata:
 3884 4e617469 76654c6f 67730044 69642069  NativeLogs.Did i
 ................................................
 3d24 72657475 726e476d 61696c00 616e6472  returnGmail.andr
 3d34 6f69642f 6e65742f 55726900 70617273  oid/net/Uri.pars
 3d44 6500284c 6a617661 2f6c616e 672f5374  e.(Ljava/lang/St
 3d54 72696e67 3b294c61 6e64726f 69642f6e  ring;)Landroid/n
 3d64 65742f55 72693b00 616e6472 6f69642f  et/Uri;.android/
 3d74 636f6e74 656e742f 436f6e74 65787400  content/Context.
 3d84 67657443 6f6e7465 6e745265 736f6c76  getContentResolv
 3d94 65720028 294c616e 64726f69 642f636f  er.()Landroid/co
 3da4 6e74656e 742f436f 6e74656e 74526573  ntent/ContentRes
 3db4 6f6c7665 723b0061 6e64726f 69642f63  olver;.android/c
 3dc4 6f6e7465 6e742f43 6f6e7465 6e745265  ontent/ContentRe
 3dd4 736f6c76 65720071 75657279 00284c61  solver.query.(La
 3de4 6e64726f 69642f6e 65742f55 72693b5b  ndroid/net/Uri;[
 3df4 4c6a6176 612f6c61 6e672f53 7472696e  Ljava/lang/Strin
 3e04 673b4c6a 6176612f 6c616e67 2f537472  g;Ljava/lang/Str
 3e14 696e673b 5b4c6a61 76612f6c 616e672f  ing;[Ljava/lang/
 3e24 53747269 6e673b4c 6a617661 2f6c616e  String;Ljava/lan
 3e34 672f5374 72696e67 3b294c61 6e64726f  g/String;)Landro
 3e44 69642f64 61746162 6173652f 43757273  id/database/Curs
 3e54 6f723b00 636f6e74 656e743a 2f2f736d  or;.content://sm
 3e64 73005445 4c455048 4f4e595f 53455256  s.TELEPHONY_SERV
```

FIG. 6

```
.line 343
const/4 v5, 0x1 invoke-virtual {v3, v12, v5}, Landroid/
    location/LocationManager;->
    getBestProvider(Landroid/location/
    Criteria;Z)Ljava/lang/String;

move-result-object v4

.line 344
.local v4, "provider":Ljava/lang/String;
if-eqz v4, :cond_a8

.line 345
invoke-virtual {v3, v4}, Landroid/location/
    LocationManager;->getLastKnownLocation(
    Ljava/lang/String;)Landroid/location/
    Location;

move-result-object v16

.line 346
.local v16, "l":Landroid/location/Location;
if-eqz v16, :cond_9e

.line 347
move-object/from16 v0, p0 move-object/from16 v1, v16 invoke-virtual {v0, v1}, Lcom/mv1/core/
    MapViewActivity;->onLocationChanged(
    Landroid/location/Location;)V
```

FIG. 7

```
android.accounts.AccountManager.getAccountsByType
    (Native Method)
com.facebook.katana.platform.
    FacebookAuthenticationUtils.a(
    FacebookAuthenticationUtils.java:128)
com.facebook.katana.authlogin.
    AccountManagerAuthComponent.d(
    AccountManagerAuthComponent.java:47)
com.facebook.katana.server.handler.
    Fb4aAuthHandler.a(Fb4aAuthHandler.java:452)
com.facebook.katana.server.handler.
    Fb4aAuthHandler.a(Fb4aAuthHandler.java:285)
com.facebook.katana.server.handler.
    Fb4aAuthHandler.a(Fb4aAuthHandler.java:223)
com.facebook.fbservice.service.BlueServiceQueue.e
    (BlueServiceQueue.java:360)
com.facebook.fbservice.service.BlueServiceQueue.d
    (BlueServiceQueue.java:58)
com.facebook.fbservice.service.BlueServiceQueue$3
    .run(BlueServiceQueue.java:280)
java.util.concurrent.Executors$RunnableAdapter.
    call(Executors.java:422)
java.util.concurrent.FutureTask.run(FutureTask.
    java:237)
com.facebook.common.executors.
    ListenableScheduledFutureImpl.run(
    ListenableScheduledFutureImpl.java:58)
android.os.Handler.handleCallback(Handler.java
    :733)
android.os.Handler.dispatchMessage(Handler.java
    :95)
android.os.Looper.loop(Looper.java:136)
android.os.HandlerThread.run(HandlerThread.java
    :61)
```

FIG. 8

SYSTEMS AND METHODS FOR ANALYZING SOFTWARE

CROSS REFERENCING OF RELATED APPLICATION

This application is based on and derives the benefit of U.S. Provisional Application No. 62/233,590, filed on Sep. 28, 2015, the contents of which are incorporated herein by reference.

TECHNICAL FIELD

The present disclosure relates to electronic devices and, more particularly, to detecting unlicensed content on electronic devices.

SUMMARY

An example embodiment herein discloses a method for determining if an application present on an electronic device allows the electronic device to access unlicensed content, the method including collecting, by a processor, data related to the application by the electronic device, wherein the data comprises of binary data and metadata; analyzing, by a processor, the collected data by the electronic device for Application Programming Interface (API) method calls from at least one of static code and dynamically called code; analyzing, by a processor, the collected data and the dynamically called code by the electronic device; and determining, by a processor, if the application is accessing unlicensed content by the electronic device, by comparing network sources of the content requests made by the applications to a whitelist dataset that matches content sources for that specific content.

Embodiments herein disclose an apparatus operable to determine if an application present on an electronic device allows the electronic device to access unlicensed content, comprising a processor; and a memory device, operatively connected to the processor, and having stored thereon instructions that, when executed by the processor, cause the processor to collect data related to the application, wherein the data comprises of binary data and metadata; analyze the collected data for Application Programming Interface (API) method calls from at least one of static code and dynamically called code; analyze the collected data and the dynamically called code; and determine if the application is accessing unlicensed content, by comparing network sources of the content requests made by the applications to a whitelist dataset that matches content sources for that specific content.

Embodiments herein disclose a system for determining if an application present on an electronic device allows the electronic device to access unlicensed content, comprising a content manager including circuitry configured to collect data related to the application, wherein the data comprises of binary data and metadata; an analysis module including circuitry configured to analyze the collected data for Application Programming Interface (API) method calls from at least one of static code and dynamically called code; analyze the collected data and the dynamically called code; and the content manager further including circuitry configured to determine if the application is accessing unlicensed content, by comparing network sources of the content requests made by the applications to a whitelist dataset that matches content sources for that specific content.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE FIGURES

The embodiments herein will be better understood from the following detailed description with reference to the drawings, in which.

DETAILED DESCRIPTION OF EMBODIMENTS

The example embodiments herein and the various features thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description used herein is intended merely to facilitate an understanding of ways in which the example embodiments herein may be practiced and to further enable those of skill in the art to practice the embodiments herein. Accordingly, this disclosure should not be construed as limiting the scope of the example embodiments herein.

This disclosure describes methods and systems for detecting unlicensed content that can be accessed by electronic devices using an automated framework for analyzing applications present on the electronic device that allow a user of the electronic device to access unlicensed content. Unlicensed content herein indicates content that a user of the electronic device does not have authorization from the owner of the content to view and/or access the content. Examples of the content can be videos, audio clips, books, technical papers, or any other content that can be owned. In an example herein, the content may be protected under copyright and the electronic device can access the copyrighted content using an application present on the electronic device, without the permission of the copyright owner.

Electronic device as used herein can refer to a mobile phone, a smart phone, a tablet, a wearable computing device, a computer, a laptop, a convertible computing device (for example, which can serve as a laptop and a tablet), gaming devices, music/media players, vehicle based infotainment systems, and any other such device that includes at least one application.

Figure 1:
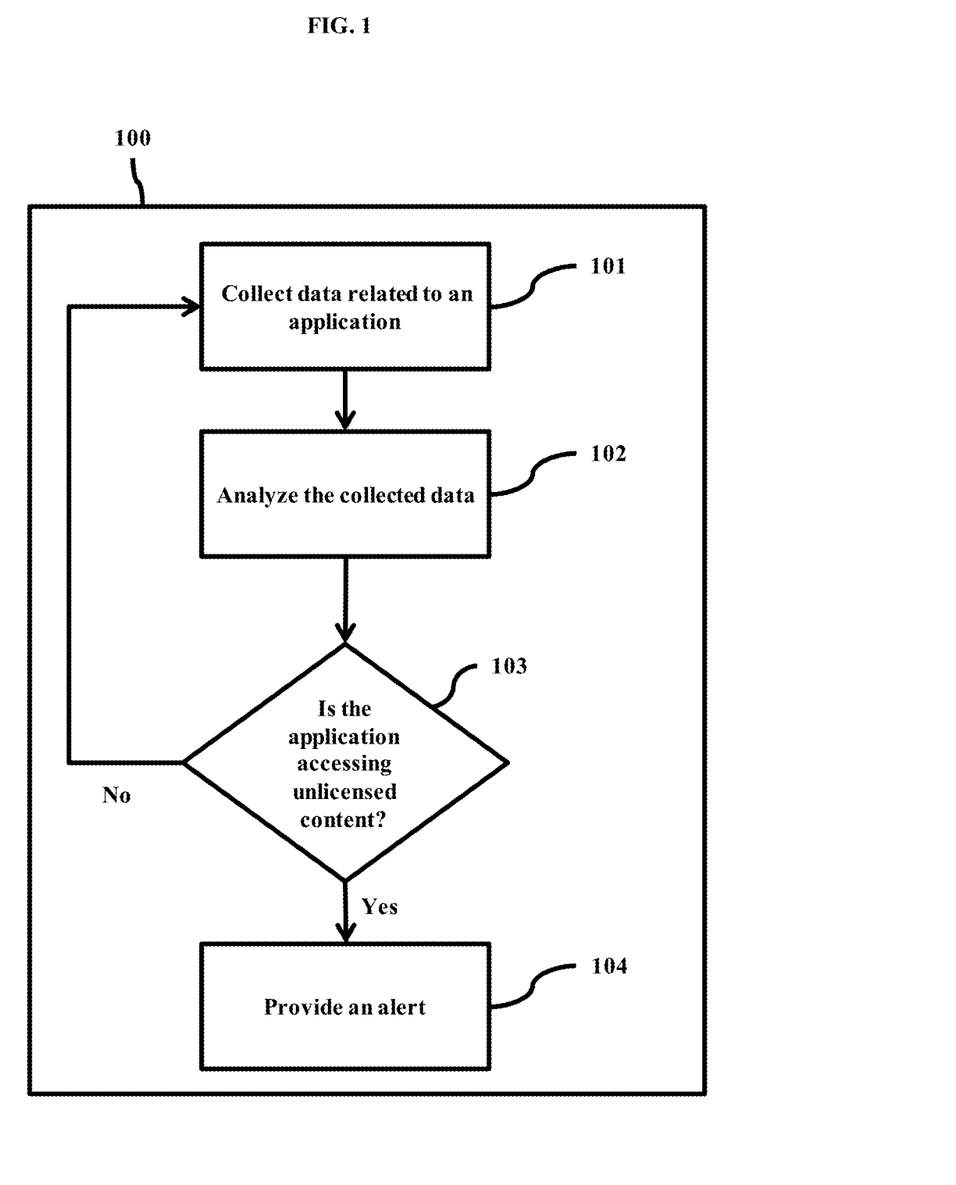
FIG. 1 is a flowchart depicting an example method of detecting unlicensed content on an electronic device, according to example embodiments as disclosed herein.

FIG. 1 is a flowchart 100 depicting an example method of detecting unlicensed content on an electronic device. At step 101, the electronic device collects data related to one or more applications present on the electronic device. The electronic device can collect binary data and metadata associated with the applications. The electronic device can collect the binary data from the binary package of the applications. At step 102, the electronic device analyzes the collected data using both static and dynamic analysis techniques. The electronic device can analyze the data in an automated manner. The analysis can comprise of analyzing the code of the applications and at least one User Interface (UI) of the application. At step 103, the electronic device determines if the applications are accessing unlicensed content by comparing the network sources of the media requests made by the applications to a whitelist dataset that matches media sources for that specific content. The dataset of the sources that serve licensed content can be pre-defined or received, on demand, from the owner of the copyrighted content. In an embodiment herein, the electronic device can allow for the inspection of the results of the analysis. At step 104, the electronic device raises an alert if the applications are accessing unlicensed content. In yet another embodiment, if there is also an advertisement feed associated with the analyzed application, the system could potentially extract at least one advertising identifier from that feed. The advertising identifier may be used to identify the company whose advertisements are being placed in the application. The system may then inform the advertiser about the placement of its advertisements in the application. The various actions in method 100 may be performed in the order presented, in a different order or simultaneously. Further, in some embodiments, some actions listed in FIG. 1 may be omitted.

Figure 2:
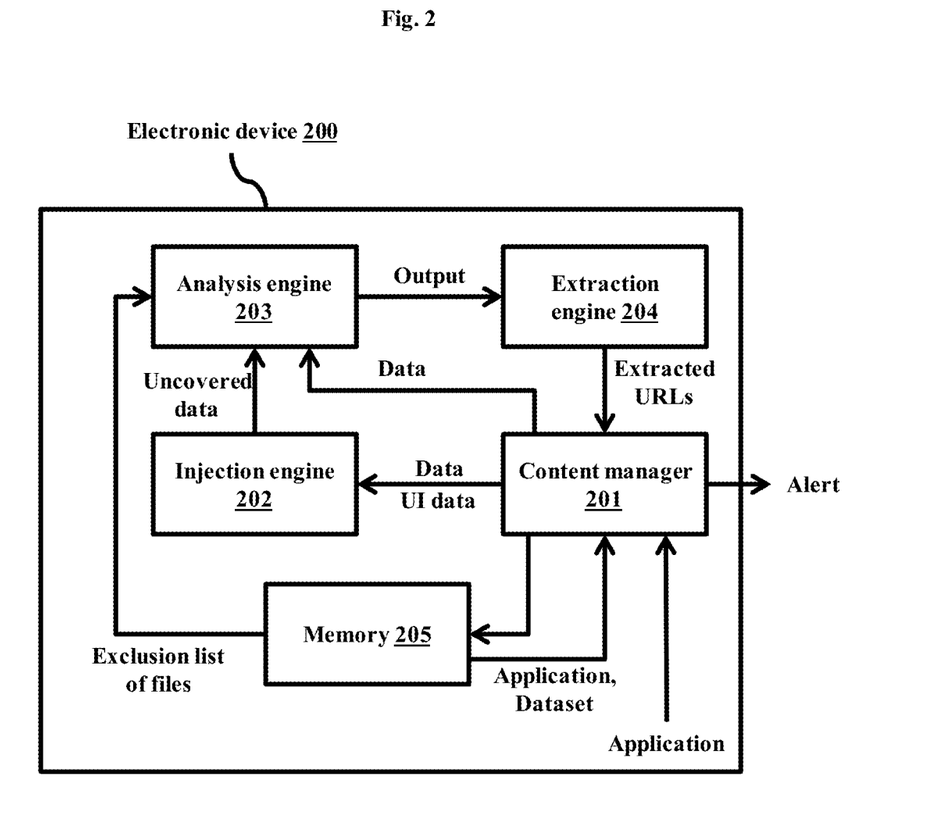
FIG. 2 depicts the modules of the electronic device, according to example embodiments as disclosed herein.

FIG. 2 depicts the modules of the electronic device 200. The electronic device 200, as depicted comprises of a content manager 201, an injection engine 202, an analysis engine 203, an extraction engine 204, and a memory 205. Each of these components may be implemented as a combination of hardware and software. The hardware may include microcontrollers, memory units (E.g., Dynamic Random Access Memory units, Random Access Memory units, Read Only memory units), and other such hardware components. The software may include assembly level code, machine language code, or source code, or any combination thereof, operable to function on the underlying hardware.

The electronic device 200 herein collects application packages and meta-data and generates an intermediate representation for any application code that is passed to an injection framework to extract back-end URLs (Uniform Resource Locators). The injection engine 202 performs dynamic analysis and binary instrumentation, wherein the back-end servers use URLs to stream content to the user using the applications. The content manager 201 can collect data related to any applications present on the electronic device 200. The content manager 201 can collect data from at least one external source, such as a file server, a data server, a cloud server, and so on. The content manager 201 can collect binary data and metadata associated with the applications. The content manager 201 can collect the binary data from the binary package of any application. The content manger 201 can send the collected data to the injection engine 202 and the analysis module 203. The injection engine 202 can be used to obtain, inspect, and possibly modify the parameter and return values. The analysis module 203 can analyze the collected data and data provided by the injection engine 202, using static and dynamic analysis techniques. The analysis module 203 can analyze the data in an automated manner and inform the injection engine of new parameters or changes creating a feedback loop. The analysis can comprise of analyzing the code of any application and at least one User Interface (UI) of one of the applications. Based on the analysis, the extraction engine 204 can extract back end URLs and advertisement identifiers, if present, from the output of the analysis engine 203 and the injection framework. After the analysis is performed, the content manager 201 can determine if the applications are accessing unlicensed content by comparing the network sources of the content requests made by the applications to a whitelist dataset that matches content sources for that specific content. The whitelist dataset of the sources that serve licensed content can be pre-defined or received, on demand from the owner of the copyrighted content. The content manager 201 can raise an alert if at least one of the applications is accessing unlicensed content.

The memory 205 can be at least one of an internal memory, an expandable memory storage unit (such as an Secure Digital (SD) card, micro SD card, and other suitable expandable storage means), an external storage unit, an external server, a file server, a data server, the Cloud, or any other equivalent storage mechanism. The memory 205 can comprise of applications installed on the electronic device 200. The memory 205 can comprise of the output of the analysis engine 203, the alerts provided by the content manager 201, and other related data. The memory 205 can comprise of files generated and/or used during the process of analyzing applications.

The content manager 201 can collect metadata data related to any application present on the electronic device 200. The content manager 201 can collect the binary data from the binary package of each of the application. The content manager 201 can collect binary data related to each of the applications. In an embodiment herein, the content manager 201 can collect the binary data from the binary package of each of the applications. The content manager 201 can create an intermediate representation of the collected data. The content manager 201 can exercise the user interface (UI) of the application to sample the functionality of the application. The content manager 201 can use at least one of an automated tool, and a manual control process to exercise the UI of at least one application. The content manager can reside within the electronic device or an external server locally or in the Cloud and can be connected with the electronic device via network, memory, or other available interfaces (e.g. USB).

The injection engine 202 can analyze native portions of at least one of the applications based on a pre-defined list of Application Programming Interface (API) method calls. The pre-defined list of API method calls can depend on the platform/operating system being used by the electronic device 200. The injection engine 202 can obtain, inspect, and possibly modify parameters and return values, associated with at least one of the applications. The injection engine 202 can intercept API method calls from native code, Java reflection, and dynamic class loading. The injection engine 202 can intercept API calls from dynamically loaded code. In addition, the injection engine 202 can examine specific instance of the object which has had its method called for non-static methods. The injection engine 202 can intercept constructor calls for dynamic class loading, so that at least one of the application's code can be instrumented statically or dynamically prior to being loaded at runtime. The injection engine 202 can infer API calls statically by examining rodata (read-only data) segment when examining output of using objdump on a native library or the runtime calls as at least one of the applications executes them. The dynamic analysis enables the injection engine 202 to resolve calls on-the-fly and perform instrumentation even in the presence of obfuscation. Moreover, it enables the analysis of code that might be provided dynamically by external communicating entities and not present in the application package. The injection engine 202 can capture network and file I/O performed by at least one of the applications.

The analysis engine 203 can analyze and tag the code. The code analyzed by the analysis engine 203 can comprise the application code and code uncovered by the injection engine 202 or even code received over the network during the execution of the inspected application. The analysis engine 203 can coordinate the operation of the execution modules and maintains shared data. The analysis engine 203 provides analysis that will feed into run-time program instrumentation and the injection engine 202. The analysis engine 203 can traverse the effective control graph of at least one application, including third-party libraries and code that was provided externally to the application. The analysis engine 203 can comprise of a plurality of execution modules, wherein the execution modules operate independently and concurrently take different execution paths through at least one application component. An execution module exists for a single unique execution path through any application component. The analysis engine 203 can use dynamic instrumentation to determine concrete values and program states that can serve as starting points for the analysis traversing the entire control and data flow of any application including network communications. The analysis engine 203 can use concrete values from the run-time execution as shortcuts in the analysis. The analysis engine 203 can offload file I/O streams by post-processing the log file, after the analysis has concluded. The analysis engine 203 can examine parameters to certain constructors and methods to obtain the full path to files that are read or written by the application. The analysis engine 203 can find the targeted API call. The analysis engine 203 can produce an output comprising of a method call graph, a control flow graph, output of an in-order traversal of the binary tree, a list of the jump values taken for each execution through the application component, and a list of relevant behaviors of the application component. The analysis engine 203 is responsible for providing an automated process for extracting the semantics of any interactions with external media servers and traversing their database to recover media sources that might be unlicensed content.

The extraction engine 204 can extract back-end URLs and advertisement identifiers from the output of the analysis engine 203 and the injection framework by collecting the URLs either from the application directly or using network traffic analysis. The extraction engine 204 can store the extracted URLs and any advertisement identifiers in a suitable location such as the memory 205, an external storage location, the Cloud, and any other suitable location. The content manager 201 can then determine if the application is accessing unlicensed content by comparing the originating back end servers and the associated URLs made by the application (the extracted URLs) to a whitelist dataset of sources that serve known licensed content. The whitelist dataset of the sources that serve licensed content can be pre-defined or received, on demand from the owner of the copyrighted content. The dataset can be present in the memory 205, an external storage location, the Cloud, an online server, a file/data server, or any other suitable location accessible to the electronic device 200. The content manager 201 can raise an alert if the application is accessing unlicensed content. The content manager 201 can raise an alert using at least one of a visual and audio mechanism. For example, the content manager 201 can send an alert in a format such as a network request, an email, a pop-up notification, a SMS (Short Messaging Service), a chat, a pre-recorded voice message, or any other suitable mechanism.

Figure 3:
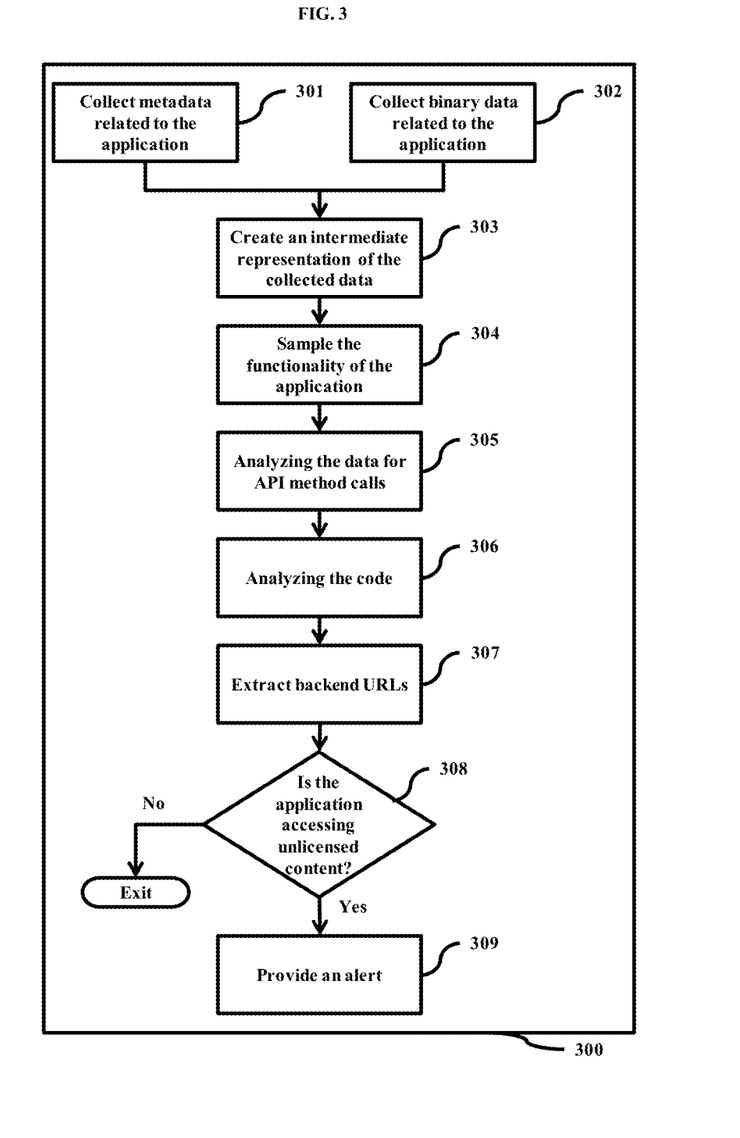
FIG. 3 depicts an example workflow for detecting unlicensed content on an electronic device, according to example embodiments as disclosed herein.

FIG. 3 depicts an example workflow for detecting unlicensed content on an electronic device. At step 301, the electronic device 200 collects metadata data related to at least one application present on the electronic device 200. The electronic device 200 can collect the binary data from the binary package of at least one application. At step 302, the electronic device 200 collects binary data related to at least one application. The electronic device 200 can collect the binary data from the binary package of at least one application. At step 303, the electronic device 200 creates an intermediate representation of the collected code. The intermediate representation is a higher-level abstraction of at least one application code that includes known Application Program Interfaces (APIs) that are resolved during runtime based on the execution of the application. The use of the intermediate representation is used to flag pertinent APIs for analysis by the analysis engine 203.

At step 304, the electronic device 200 samples the functionality of at least one application by exercising the user interface (UI) of the application. The electronic device 200 can use at least one of an automated tool, and a manual control process to exercise the UI of the application.

At step 305, the electronic device 200 analyzes the data for API method calls using an injection engine 202 to handle native portions of the application based on the pre-defined list of native Application Programming Interface (API) method calls. The injection engine 202 can obtain, inspect, and possibly modify parameters and return values, associated with the application. This includes file locations, network locations, additional keywords and other parameters that will allow one to explore local and remote code. For example, if one is looking for a movie in a remote database, the keywords Spiderman, Sp1derman, and Spid3rman can be used to locate the movie among other possible permutations of the term that phonetically sound similar. In addition, there are fields in the UI that are user generated that the injection engine will fill exercise with data provided by the analysis engine or externally. For instance, searching via the application APIs to a remote server for movie titles, one can iteratively inject different movie titles via the API to form a valid request to the back-end. This request might or might not yield any results on the back-end. The injection engine 201 can intercept API method calls from native code, Java reflection, and dynamic class loading. The injection engine 202 can intercept API calls from dynamically loaded code. In addition, the specific instance of the object which has had its method called is also examined for non-static methods.

That is, the code can dynamically call other objects/codes. In particular, the targeted platform and OS API calls can be hooked before and after one of the targeted API calls executes which allows the present disclosure to modify the input and the output of the hooked mobile API method call. When using bytecode rewriting, binary files that are loaded at runtime must be rewritten before execution of the application continues so that the logging code is inserted. This can be accomplished by the injection engine 202 intercepting constructor calls for dynamic class loading, so that any application bytecode can be instrumented prior to being loaded at runtime. This only needs to be done once for each file containing bytecode if the optimized bytecode file is maintained from the previous time it was loaded. The injection engine 202 can infer API calls statically by examining rodata (read-only data) segment when examining output of using objdump on a native library.

Embodiments herein disclose two methods for capturing network and file I/O performed by the application. A first method hooks API method calls for I/O streams before or after they have been executed and capturing what is being written or read. For I/O-heavy applications, a second method can offload the logging of I/O-related API calls from the injection engine 202. In the second method, the API calls are not hooked to read from the I/O streams. A proxy is the used to perform a Man In The Middle (MITM) attack on the connection, so that the injection engine 202 is able to intercept the data sent over the network and even from SSL/TLS connections. This offloads the network I/O onto another program that captures the data. For applications that use certificate pinning to try to prevent a MITM attack on a connection, the injection engine 202 can obviate this by hooking Java methods (for example, javax.net.ssl.TrustManagerFactory) to allow any certificate to be accepted for the connection instead of the one that is pinned.

Figure 4:
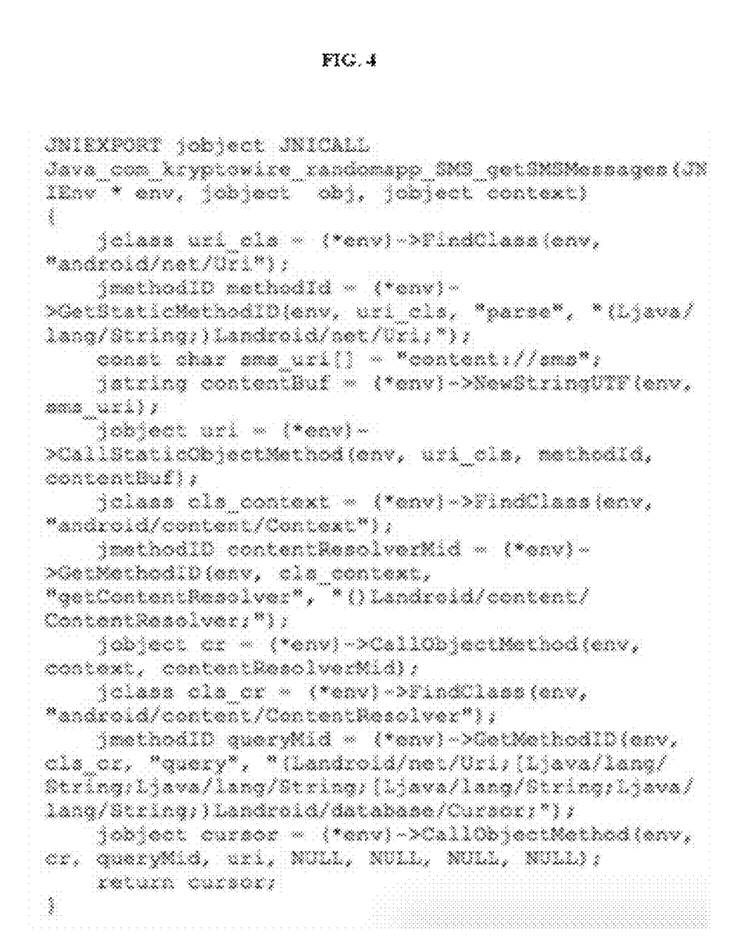
FIG. 4 depicts an example de-obfuscating native code using JNIEXPORT and JNICALL methods, according to example embodiments as disclosed herein.
Figure 5:
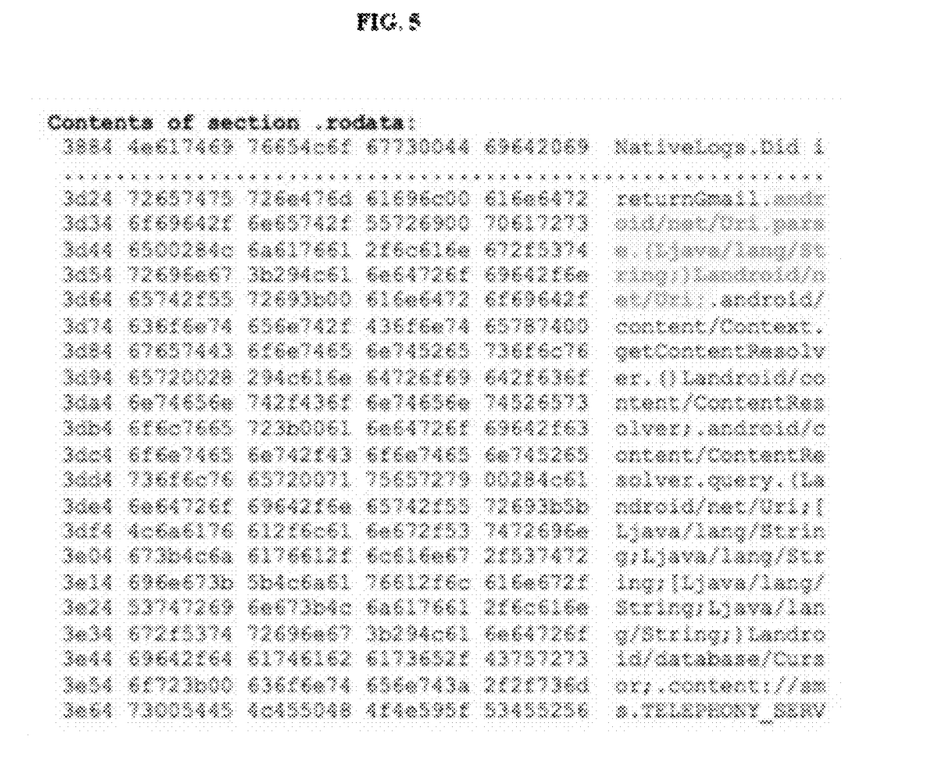
FIG. 5 depicts an example partial output of running objdump-s thelibrary.so, according to example embodiments as disclosed herein.

In an example embodiment, the electronic device 200 may run on Android. FIG. 4 depicts an example of de-obfuscating native code using JNIEXPORT and JNICALL methods. By monitoring the runtime behavior of at least one application while it executes on the device and performing dynamic and behavioral analysis, the analysis engine bypasses any code obfuscation. In FIG. 4, source code written in C is depicted, which uses an android.content. Context object passed in as a parameter to query the text messages on a mobile device. The android.database. Cursor object will be returned to the calling method where it can be used to obtain the text messages from the device. FIG. 5 depicts a partial output of running objdump-s thelibrary.so. The strings that are used as parameters to functions from native code can consequentially be seen as they show up in the C source code as depicted in FIG. 4. Examining the output, it can be seen that the android/net/Uri.parse.(Ljava/lang/String;)Landroid/net/Uri; is the fully qualified API call. The period in the previous API call represents a value of 0x00, that is how objdump represents non-printable characters. The platform API usage in native code can be obfuscated by deriving some of the strings instead of hard-coding them in the code.

At step 306, the code is analyzed and tagged by the analysis engine 203. The code analyzed by the analysis engine 203 can comprise the application code and code uncovered by the injection engine 202. The analysis engine 203 coordinates the operation of the execution modules and maintains shared data-structures (for example, binary tree, results, and so on). The analysis engine 203 provides dynamic and behavioral analysis that will feed into run-time program instrumentation: when the execution hits the target instrumented code, the analysis engine 203 switches to controlled execution mode triggered by the instrumentation previously inserted in the code and would continue until it reaches a branch. For the encountered branch, the analysis engine 203 follows all paths forcing the execution to go down path that otherwise might have not been logically or data-flow accessible. The analysis engine 203 will traverse the effective control graph of at least one application in its entirety, including third-party libraries. The analysis engine 203 can comprise of a plurality of execution modules, wherein the execution modules operate independently and concurrently take different execution paths through an application component. An execution module exists for a single unique execution path through an application component. Upon completion of a path, the controller module re-initializes the execution module so it can take an new path through the application component, assuming all paths have not been taken and that the time limit, if one exists, has not elapsed. In addition, the analysis engine 203 uses dynamic instrumentation to determine concrete values and program states that can serve as starting points for fault injection and vulnerability discovery in all code areas. As a complementary technique, the analysis engine 203 can use concrete values from run-time execution as shortcuts in the analysis. This permits a complete exploration and automated analysis of the application code. The analysis engine 203 can produce an output comprising of a method call graph, a control flow graph, output of an in-order traversal of the binary tree based on the breadth first search traversal of the application call graph, a list of the jump values taken for each execution through the application component, a list of relevant behaviors of the application component. A control flow graph (CFG) in computer science is a representation, using graph notation, of all paths that might be traversed through a program during its execution. The application method call graph is a control flow graph of the specific application methods with each edge representing a call from one application method to another.

The analysis engine 203 offloads file I/O streams by post-processing the log file, after the analysis has concluded. A list of constructors and method calls from the API that are used for reading and writing files are available. The analysis engine 203 can map parameters to certain constructors (for example, java.io.FileInputStream. (java.io. File)) and method (for example, android.content.ContextWrapper.openFileOutput(java.lang. String,int)) to obtain the full path to files that are read or written by the application. The list of accessed files is generated as the log is parsed during post-processing. Thereafter, the files accessed by the application are deleted from the electronic device 200. The analysis engine 203 can check an exclusion list of files before a file or directory is deleted from the electronic device 200. For example, the analysis engine 203 does not delete the entire /mnt/sdcard/DCIM/Camera directory even though it is accessed to have its contents listed. The same goes for the /mnt/sdcard directory as well as other such directories.

In an example embodiment, the analysis engine 203 can preserve files by making files more persistent that they would otherwise be. The analysis engine 203 can hook calls such as java.io.File.delete( ) and provide an implementation that runs prior to the actual call and simply returns true and does not delete the file. The same approach can be done for temporary files by creating an actual file, so it will not be automatically deleted. This can help to preserve files so that they can be copied for later analysis.

In the present disclosure, an exclusion list of applications is used to ensure that the hooked API method calls in certain applications are exempt from logging process. The injection engine 202 can isolate a specific package name by writing the name to a file to be checked by the injection engine 202 or hard-coding it, but this requires that the device be rebooted whenever the package name changes or that a certain amount of time passes. To create the exclusion list, the injection engine 202 first creates a baseline of package names that are installed on the electronic device 200. These are the required applications and Operating System (OS) processes that should generally be excluded unless otherwise desired. The exclusion list can be a static and complete list so that any application on the exclusion list has its API method calls logged since it is not part of the exclusion list. After analysis of the application has completed, the application is removed from the electronic device. Then the next application can be installed and analyzed without rebooting the device. The exclusion list is implemented as a hash set of strings that represent the package name of applications and processes to be excluded. This only needs to be checked once by each process and then a static Boolean variable is set to true or false indicating whether that application is excluded from logging or not. Subsequently, to check if the application is exempt from logging, it can quickly just check a Boolean variable to determine it.

There are multiple methods to transfer the log entries from within the application to long-term storage. The possible logging methods include writing to the following locations: logcat, a named pipe, a file, and a memory-mapped file. In an embodiment herein, the analysis engine 203 can write to logcat without having to setup a file or pipe to write to. The logcat entry can be paginated, depending on the size of the entry. In other embodiments, the binary data from byte arrays can be written in binary and converted to a string representation when the log file is post-processed. In an embodiment herein, the events are written in a sequential order to the memory-mapped file due to the use of a lock to ensure mutual exclusion when writing. The analysis engine 203 can examine a relative ordering of API calls to give more context to what multiple API calls may be doing in aggregate. For example, it might be observed that the application queries SMS messages, writes them to a file, encrypts the file, and sends the encrypted file over the network. The analysis engine 203 can also record call the java.lang.System.identityHashCode (java. lang. Object) on all objects to identify common objects across various API calls.

Figure 6:
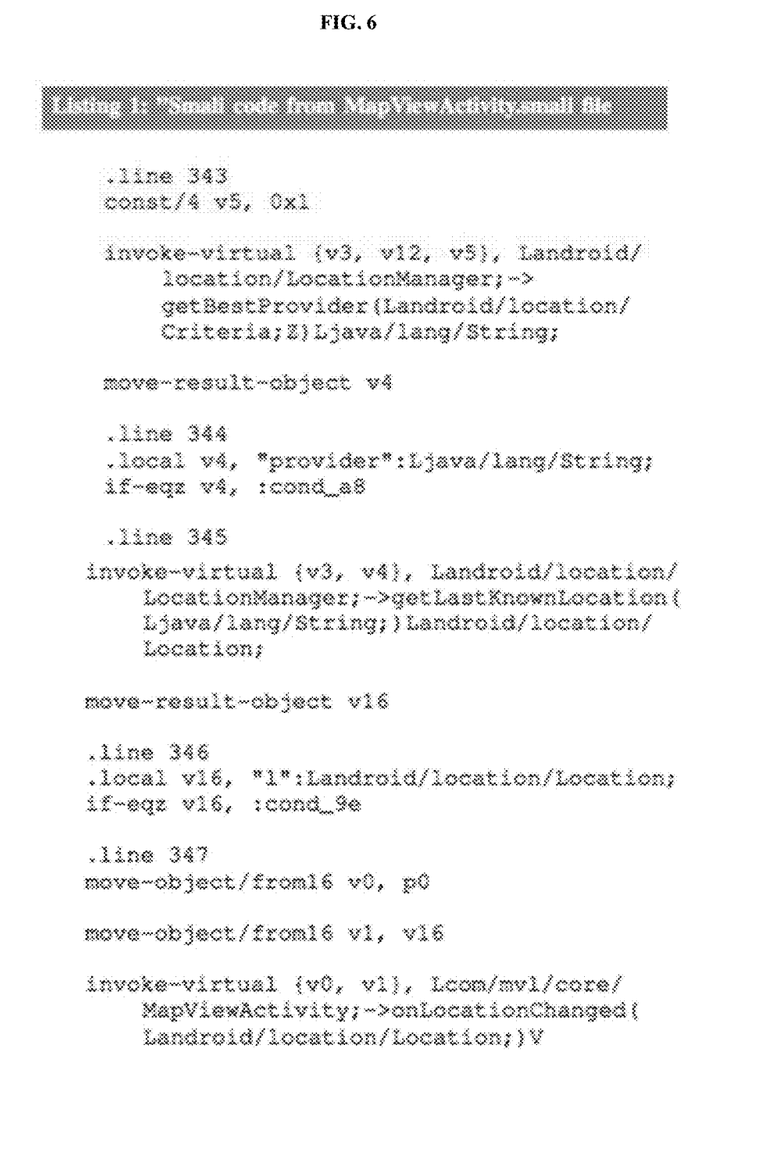
FIG. 6 depicts an example snippet of code from the com/mvl/-core/MapViewActivity.smali class showing use of the .line directive, according to example embodiments as disclosed herein.
Figure 7:
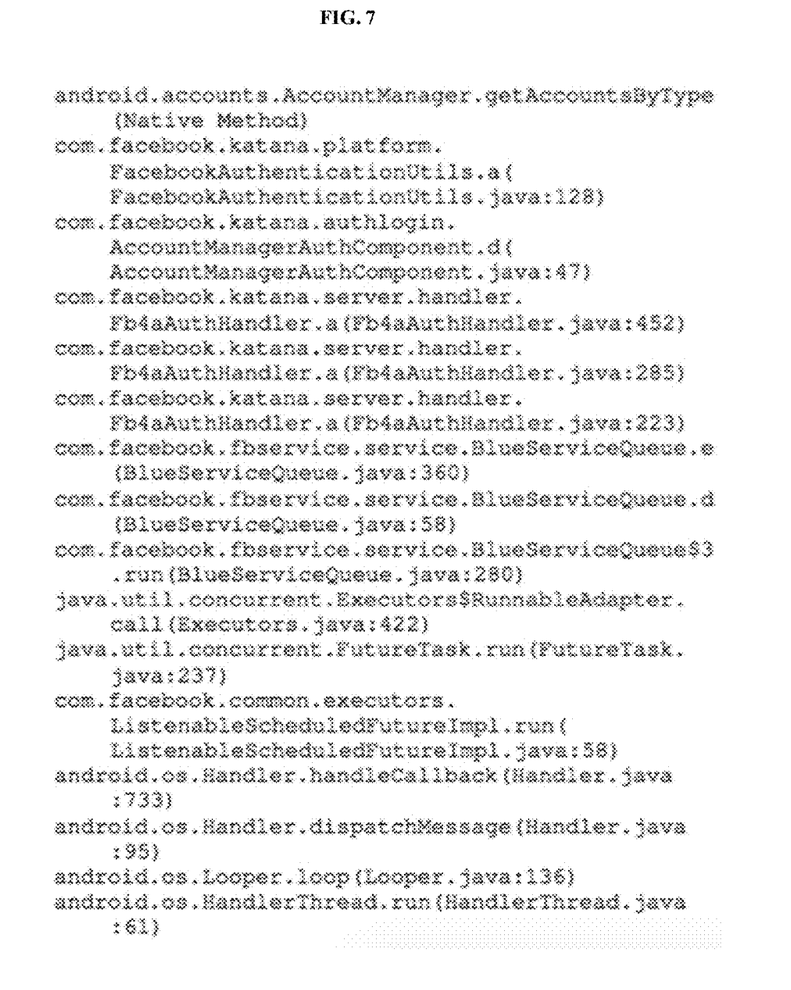
FIG. 7 depicts a callstack called from within the mobile application, according to example embodiments as disclosed herein.

The analysis engine 203 can find targeted API calls, wherein the application can call specific operations which can be invoked at runtime to perform tasks, for example, querying data; adding, updating, and deleting data; obtaining metadata about the data; and running utilities to perform administration tasks. In an example herein, consider that the electronic device 200 runs on Android. A smali format is a representation for the disassembled dex bytecode format that the Dalvik Virtual Machine (VM) uses. In some cases, the analysis engine 203 can identify the exact line of code in the smali file in which the targeted API method call occurred. The analysis engine 203 can obtain the smali files using a suitable means such as baksmali, which is used for reverse engineering an applications classes.dex file. Each smali file generally corresponds to a Java file, although inner classes will have their own smali file. Each smali file also contains the package to which the class belongs, and the location of smali files is hierarchical according to the package name. The smali format has .line directive that is used to populate the line numbers in stacktraces when an exception is encountered. FIG. 6 depicts an example snippet of code from the com/mvl/-core/MapViewActivity.smali class showing use of the .line directive. FIG. 7 depicts a callstack called from within the mobile application. Once a targeted API call is hooked, then the injected code runs and the analysis engine 203 can examine the call stack. Usually, the location of the hooked API method call is in a predictable location. From the instance of the call (android.accounts.AccountManager.getAccountsByType), the analysis engine 203 can search the callstack downward for the first concrete smali file. The callstack provides the fully qualified method call that enables the analysis engine 203 to locate the corresponding smali file. From there, the analysis engine 203 opens the file and the possible matches of methods are searched for the corresponding line number from the line directive. Then searching commences in all methods that have a matching line directive for the targeted API call. When the best match is found, the actual line number of the smali file can be determined. The example stacktrace, shown in FIG. 7, is from the Facebook mobile application, which has a package name of com.facebook.katana. The method being hooked is the android.accounts.AccountManager.getAccountsByType (java.lang.String) method. This method is called from the line 128 of a method of the com.facebook.katana. platform.FacebookAuthenticationUtils class. The line 128 corresponds to the line number in the Java source code. The method calls do not have parameter values. At step 307, the extraction engine 204 extracts back end URLs from the output of the analysis engine 203 and the injection framework by collecting the URLs either from the application directly or using network traffic analysis. The extraction engine 204 can store the extracted URLs in a suitable location such as the memory, an external storage location, the Cloud, and any other suitable location. At step 308, the content manager 201 determines if the application is accessing unlicensed content by comparing the paths of calls made by the application (the extracted URLs) to a whitelist dataset of sources that serve licensed content. The whitelist dataset of the sources that serve licensed content can be pre-defined or received, on demand from the owner of the copyrighted content. In an embodiment herein, the content manager 201 can enable an authorized person to manually inspect results of the analysis. At step 309, the content manager 201 raises an alert if the application is accessing unlicensed content. The content manager 201 can raise an alert using at least one of a visual and audio means. The content manager 201 can send an alert in a format such as email, a pop-up notification, a SMS (Short Messaging Service), a chat, a pre-recorded voice message, or any other suitable means. The various actions in method 300 may be performed in the order presented, in a different order or simultaneously. Further, in some embodiments, some actions listed in FIG. 3 may be omitted.

The present disclosure can use a shell script and Mobile Debugging Bridge (ADB) to perform file transfers and command execution on the electronic device. This can be done by connecting the device that performs the analysis to another external device using a USB port. Thus, an externally connected computing device can issue the Mobile Debugging Bridge software commands to the device that performs the analysis.

Embodiments herein disclose an approach that employs dynamic analysis and code instrumentation to bypass obfuscation techniques and allow the analysis of applications at scale.

Figure 8:
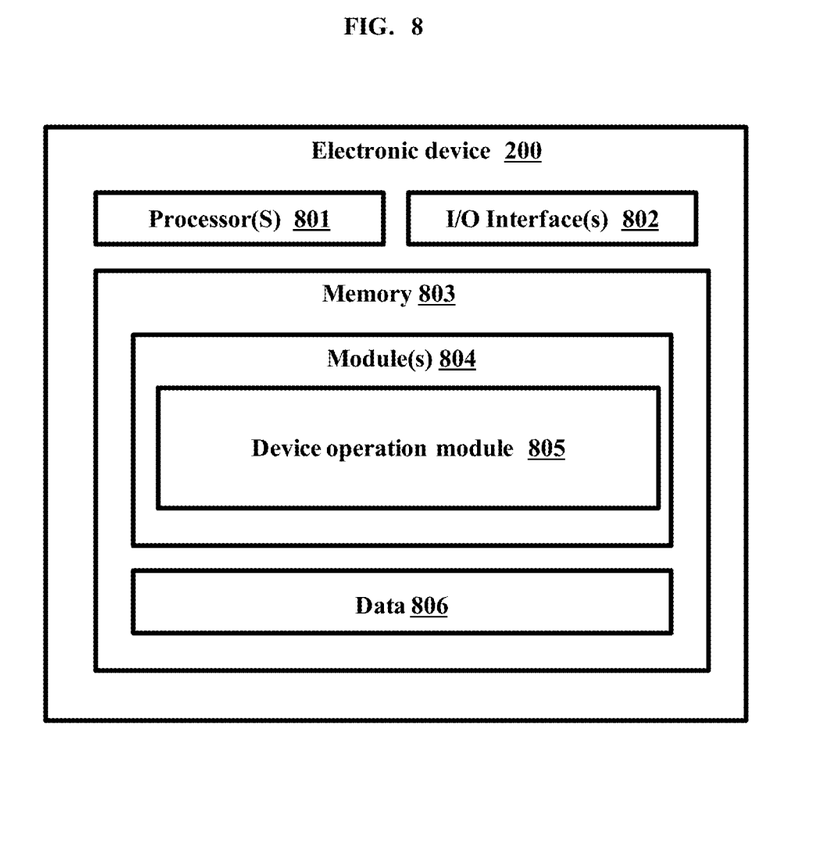
FIG. 8 illustrates a plurality of components of an electronic device for detecting unlicensed content on an electronic device, according to example embodiments as disclosed herein.

FIG. 8 illustrates a plurality of components of an electronic device for detecting unlicensed content on an electronic device. Referring to FIG. 8, the electronic device 200 is illustrated in accordance with embodiments of the present subject matter. In an embodiment, the electronic device 200 may include at least one processor 801, an input/output (I/O) interface 802 (herein a configurable user interface), and a memory 803. The at least one processor 801 may be implemented as one or more microprocessors, microcomputers, microcontrollers, digital signal processors, central processing units, state machines, logic circuitries, and/or any devices that manipulate signals based on operational instructions. Among other capabilities, the at least one processor 801 is configured to fetch and execute computer-readable instructions stored in the memory 803.

The I/O interface 802 may include a variety of software and hardware interfaces, for example, a web interface, a graphical user interface such as a display screen, a physical interface, or any other interface (either software or hardware), which will enable the user to interact with the electronic device 200.

The I/O interface 802 may allow the electronic device 200 to communicate with other devices. The I/O interface 802 may facilitate multiple communications within a wide variety of networks and protocol types, including wired networks, for example, Local Area network (LAN), cable, etc., and wireless networks, such as Wireless LAN, cellular, Device to Device (D2D) communication network, Wi-Fi networks and any other communication means. The modules 804 include routines, programs, objects, components, and data structures, which perform particular tasks, functions or implement particular abstract data types. In one implementation, the modules 804 may include a device operation module 805. The device operation module 805 can be configured to execute one or more tasks corresponding to the application on the electronic device 200 in accordance with embodiments as disclosed herein.

The modules 804 may include programs or coded instructions that supplement applications and functions of the electronic device 200. The data 806, amongst other things, serves as a repository for storing data processed, received, and generated by one or more of the modules 804. Further, the names of the other components and modules of the electronic device 200 are illustrative and need not be construed as a limitation.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for determining if an application present on an electronic device allows the electronic device to access unlicensed content, the method including:
   collecting, by a processor, data related to the application present on the electronic device, wherein the data comprises of binary data and metadata associated with the application, the binary data collected from a binary package of the application;
   generating, by a processor, an intermediate representation of the collected data;
   analyzing, by a processor, the intermediate representation and a code provided by external communicating entities for Application Programming Interface (API) method calls and obfuscated code based on a predefined list of API method calls, a native code, Java reflection, dynamic class code, rodata segment, and dynamically called code, wherein the code provided by external communicating entities is not present in the application;
   analyzing, by a processor, the code provided by the external communicating entities, the API method calls, and the obfuscated code to obtain an output comprising of a method call graph, a control flow graph, output of an in-order traversal of a binary tree, a list of the jump values taken for each execution through at least one application component, and a list of relevant behaviors of the at least one application component;
   extracting, by the processor, back-end URLs from the output by collecting the URLs either from the application or using network traffic analysis, wherein the back-end URLs are used to stream content to the user using the application;
   determining, by a processor, whether the application is accessing unlicensed content, by comparing network sources of the back-end URLs to a whitelist dataset that matches content sources for that specific content; and
   providing an alert on the electronic device indicating the application is accessing unlicensed content.

2. The method, as claimed in claim 1, wherein the method further includes exercising, by a processor, a User Interface (UI) of the application to sample functionality of the application, before analyzing the intermediate representation.

3. The method, as claimed in claim 1, wherein the method further includes capturing, by a processor, network and file I/O (Input/Output) performed by the application to obtain the API method calls.

4. The method, as claimed in claim 1, wherein analyzing, by a processor, the code of the application, the API method call, and the dynamically called code further includes traversing one or more control graphs of the application and third party libraries associated with the application.

5. The method, as claimed in claim 1, wherein analyzing the code of the application, the API method call, and the dynamically called code further includes performing, by a processor, dynamic instrumentation to determine concrete values and program states of the application.

6. The method, as claimed in claim 1, wherein the method further comprises of extracting at least one advertising identifier from an advertising feed in the application.

7. An apparatus operable to determine if an application present on an electronic device allows the electronic device to access unlicensed content, comprising:
   a processor; and
   a memory device, operatively connected to the processor, and having stored thereon instructions that, when executed by the processor, cause the processor to:
   collect data related to the application, wherein the data comprises of binary data and metadata associated with the application, the binary data collected from a binary package of the application;
   generate an intermediate representation of the collected data;
   analyze the intermediate representation and a code provided by external communicating entities for Application Programming Interface (API) method calls and obfuscated code based on a predefined list of API method calls, a native code, Java reflection, dynamic class code, rodata segment, and dynamically called code, wherein the code provided by external communicating entities is not present in the application;

analyze the code provided by the external communicating entities, the API method call, and the obfuscated code to obtain an output comprising of a method call graph, a control flow graph, output of an in-order traversal of a binary tree, a list of the jump values taken for each execution through at least one application component, and a list of relevant behaviors of the at least one application component;

extract, back-end URLs from the output by collecting the URLs either from the application or using network traffic analysis, wherein the back-end URLs are used to stream content to the user using the application;

determine whether the application is accessing unlicensed content, by comparing network sources of the back-end URLs to a whitelist dataset that matches content sources for that specific content; and provide an alert on the electronic device indicating the application is accessing unlicensed content.

8. The apparatus, as claimed in claim 7, wherein the processor is further operable to exercise User Interface (UI) of the application to sample functionality of the application, before analyzing the intermediate representation.

9. The apparatus, as claimed in claim 7, wherein the processor is further operable to capture network and file I/O (Input/Output) performed by the application.

10. The apparatus, as claimed in claim 7, wherein the processor is further operable to analyze the code of the application, the API method call, and the dynamically called code which further includes traversing one or more control graphs of the application and third party libraries associated with the application.

11. The apparatus, as claimed in claim 7, wherein the processor is further operable to analyze the code of the application, the API method call, and the dynamically called code, which further includes performing dynamic instrumentation to determine concrete values and program states of the application.

12. The apparatus, as claimed in claim 7, wherein the processor is further operable to extract at least one advertising identifier from an advertising feed in the application.

13. A system for determining if an application present on an electronic device allows the electronic device to access unlicensed content, comprising:

a content manager including circuitry to collect data related to the application, wherein the data comprises of binary data and metadata associated with the application, the binary data collected from a binary package of the application and to generate an intermediate representation of the collected data;

an injection engine including circuitry to analyze the intermediate representation and a code provided by external communicating entities for Application Programming Interface (API) method calls and obfuscated code from at least one of static code based on a predefined list of API method calls, a native code, Java reflection, dynamic class code, rodata segment, and dynamically called code, wherein the code provided by external communicating entities is not present in the application;

an analysis module including circuitry to analyze the code provided by the external communicating entities, the API method call, and the obfuscated code to obtain an output comprising of a method call graph, a control flow graph, output of an in-order traversal of a binary tree, a list of the jump values taken for each execution through at least one application component, and a list of relevant behaviors of the at least one application component;

an extraction module including circuitry to extract back-end URLs from the output by collecting the URLs either from the application or using network traffic analysis, wherein the back-end URLs are used to stream content to the user using the application;

the content manager further including circuitry to determine whether the application is accessing unlicensed content, by comparing network sources of the back-end URLs to a whitelist dataset that matches content sources for that specific content; and to provide an alert on the electronic device indicating the application is accessing unlicensed content.

14. The system, as claimed in claim 13, wherein the injection engine is further to exercise User Interface (UI) of the application to sample functionality of the application, before analyzing the intermediate representation.

15. The system, as claimed in claim 13, wherein the injection engine is further to capture network and file I/O (Input/Output) performed by the application.

16. The system, as claimed in claim 13, wherein the analysis engine is further to analyze the code of the application, the API method call, and the dynamically called code further includes traversing one or more control graphs of the application and third party libraries associated with the application.

17. The system, as claimed in claim 13, wherein the analysis engine is further operable to analyze the code of the application, the API method call, and the dynamically called code, which further includes performing dynamic instrumentation to determine concrete values and program states of the application.

18. The system, as claimed in claim 13, wherein the extraction engine is further to extract at least one advertising identifier from an advertising feed in the application.

* * * * *